US009637162B2

(12) United States Patent
Taenaka

(10) Patent No.: US 9,637,162 B2
(45) Date of Patent: May 2, 2017

(54) RACK GUIDE UNIT

(71) Applicant: JTEKT CORPORATION, Osaka-shi, Osaka (JP)

(72) Inventor: Makoto Taenaka, Kashiba-shi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/133,716

(22) Filed: Apr. 20, 2016

(65) Prior Publication Data

US 2016/0332658 A1  Nov. 17, 2016

(30) Foreign Application Priority Data

May 11, 2015  (JP) ................................ 2015-096637

(51) Int. Cl.
| | |
|---|---|
| *F16H 55/18* | (2006.01) |
| *B62D 3/12* | (2006.01) |
| *F16H 19/04* | (2006.01) |
| *F16H 57/12* | (2006.01) |
| *F16H 55/28* | (2006.01) |

(52) U.S. Cl.
CPC .............. *B62D 3/123* (2013.01); *F16H 19/04* (2013.01); *F16H 55/283* (2013.01); *F16H 57/12* (2013.01); *F16H 2057/127* (2013.01)

(58) Field of Classification Search
CPC .. F16H 55/283; F16H 2057/127; F16H 19/04; F16H 57/12; B62D 3/123; F16F 1/32
USPC ......................................................... 267/162
See application file for complete search history.

(56) References Cited

U.S. PATENT DOCUMENTS

| | | | | | |
|---|---|---|---|---|---|
| 3,127,157 | A | * | 3/1964 | Webb ......................... | F16F 1/32 267/136 |
| 3,172,535 | A | * | 3/1965 | Ingle .......................... | F16F 1/32 206/445 |
| 3,375,000 | A | * | 3/1968 | Seamands ................. | F16F 1/32 267/162 |

(Continued)

FOREIGN PATENT DOCUMENTS

| | | |
|---|---|---|
| EP | 2 803 555 A1 | 11/2014 |
| JP | S61-129670 U | 8/1986 |

(Continued)

OTHER PUBLICATIONS

Aug. 10, 2016 Extended European Search Report issued in Patent Application No. 16167037.7.

*Primary Examiner* — William Kelleher
*Assistant Examiner* — Jake Cook
(74) *Attorney, Agent, or Firm* — Oliff PLC

(57) ABSTRACT

A rack guide unit includes a closure member, a rack guide, and an urging unit. The closure member is secured to an external opening end of an accommodation portion of a housing. The rack guide is accommodated in the accommodation portion so as to be movable in an advancing/withdrawing direction and supports the rack shaft so that the rack shaft is slidable in an axial direction. The urging unit is arranged between the closure member and the rack guide. The urging unit includes a stack of a plurality of coned disc springs urging the rack guide toward the rack shaft and arranged in an identical orientation, and an auxiliary coned disc spring that serves as a holding member holding the stack.

4 Claims, 4 Drawing Sheets

(56) References Cited

U.S. PATENT DOCUMENTS

| | | | |
|---|---|---|---|
| 3,430,942 A * | 3/1969 | MacGlashan, Jr. | F16F 1/32 267/162 |
| 3,433,501 A * | 3/1969 | Hertel | B62D 3/123 280/93.515 |
| 3,980,016 A * | 9/1976 | Taylor | B30B 15/061 100/295 |
| 4,724,717 A | 2/1988 | Chikuma | |
| 7,134,648 B1 * | 11/2006 | Rode | F16F 3/10 267/162 |
| 2002/0024190 A1 | 2/2002 | Tanaka | |
| 2008/0116623 A1 * | 5/2008 | Crocker | F16F 1/32 267/169 |
| 2011/0037210 A1 * | 2/2011 | Rode | F16F 1/32 267/162 |
| 2012/0318952 A1 | 12/2012 | Yang et al. | |

FOREIGN PATENT DOCUMENTS

| | | |
|---|---|---|
| JP | 2002-067982 A | 3/2002 |
| JP | 2013-154709 A | 8/2013 |

\* cited by examiner

RACK GUIDE UNIT

INCORPORATION BY REFERENCE

The disclosure of Japanese Patent Application No. 2015-096637 filed on May 11, 2015 including the specification, drawings and abstract, is incorporated herein by reference in its entirety.

BACKGROUND OF THE INVENTION

1. Field of the Invention

The present invention relates to a rack guide unit.

2. Description of Related Art

A steering system that includes a plurality of stacked coned disc springs has been developed (see Japanese Patent Application Publication No. 2013-154709 (JP 2013-154709A), for example). The coned disc springs serve as an urging member that urges a rack guide accommodated in an accommodation portion of a housing toward a rack shaft. In addition, a steering system that uses a compression coil spring and a coned disc spring arranged in parallel to each other has been developed (see Japanese Patent application publication No. 2002-67982 (JP 2002-67982A), for example). The compression coil spring and the coned disc spring serve as an urging member that urges a rack guide accommodated in an accommodation portion of a housing toward a rack shaft.

In JP2013-154709A, efficiency of assembly is impaired because the coned disc springs are easily separated from one another when installed in the accommodation portion during assembling. In JP2002-67982A, efficiency of assembly is impaired because the coil spring and the coned disc spring are individually installed in the accommodation portion during assembling.

SUMMARY OF THE INVENTION

An object of the present invention is to provide a rack guide unit that has excellent assembly efficiency.

A rack guide unit according to an aspect of the present invention includes: a housing having an accommodation portion through which a rack shaft that is meshed with a pinion shaft passes; a closure member secured to an external opening end that is provided on the opposite side of the accommodation portion from the rack shaft; a rack guide that is accommodated in the accommodation portion so as to be movable in an advancing/withdrawing direction toward the rack shaft or the closure member, and that supports the rack shaft so that the rack shaft is slidable in an axial direction of the rack shaft; and an urging unit that includes a stack of a plurality of coned disc springs urging the rack guide toward the rack shaft and arranged in an identical orientation and a holding member holding the stack, and that is arranged between the closure member and the rack guide.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
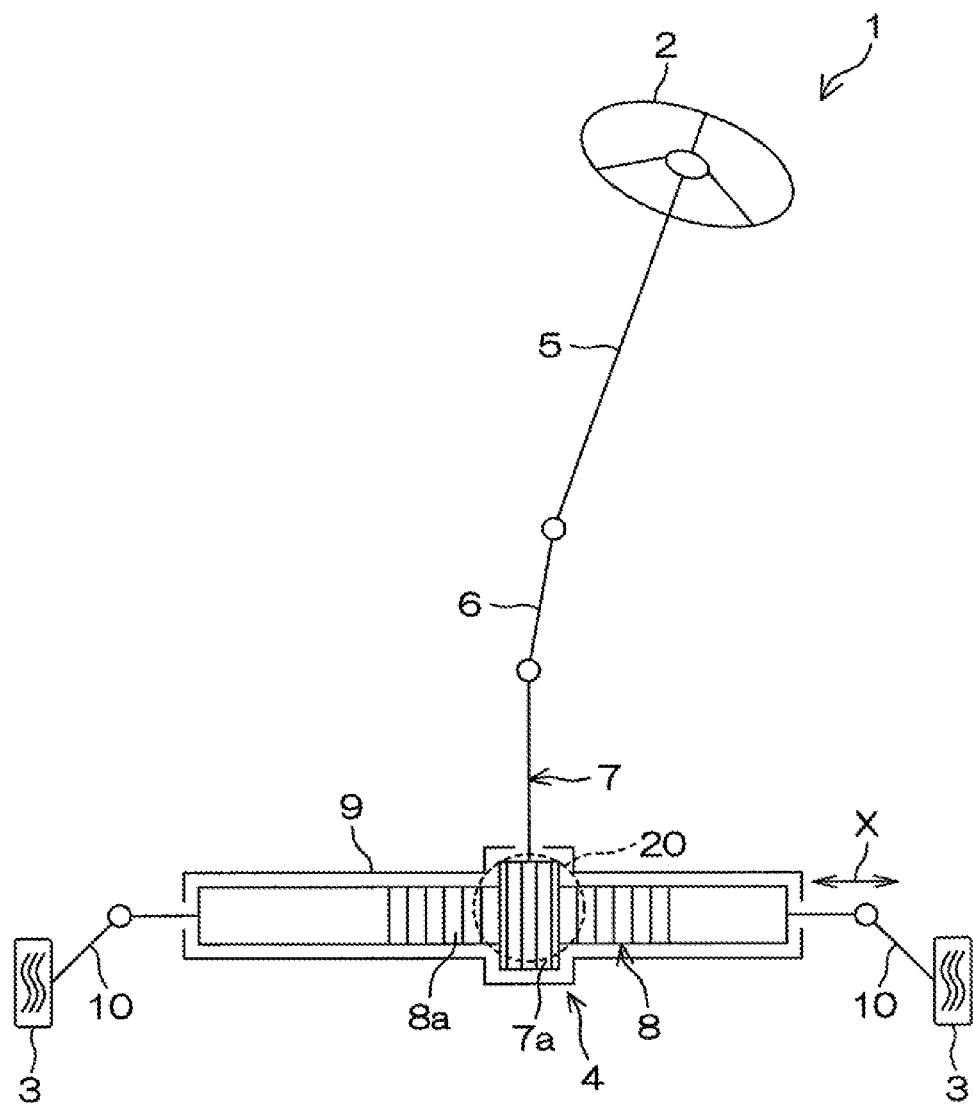
FIG. 1 is a diagram schematically showing the configuration of a steering system to which a rack guide unit of a first embodiment of the present invention is applied.

Hereinafter, embodiments of the present invention will be described with reference to the accompanying drawings. FIG. 1 is a diagram schematically showing the configuration of a steering system 1 to which a rack guide unit 20 of a first embodiment of the present invention is applied. Referring to FIG. 1, the steering system 1 includes a steering member 2 and a steering operation mechanism 4. The steering member 2 is, for example, a steering wheel that is operated to rotate. The steering operation mechanism 4 steers steered wheels 3 with the rotation of the steering member 2. The steering system 1 includes a steering shaft 5 and an intermediate shaft 6. One end of the steering shaft 5 is coupled to the steering member 2.

The steering operation mechanism 4 is formed of, for example, a rack-and-pinion mechanism. The steering operation mechanism 4 includes a pinion shaft 7, and a rack shaft 8 that serves as a steered shaft. The pinion shaft 7 is coupled to the steering shaft 5 via the intermediate shaft 6. The pinion shaft 7 is provided with a pinion 7a formed at one end of the pinion shaft 7. The rack shaft 8 is provided with a rack 8a on part of the outer peripheral face of the rack shaft 8 in an axial direction X, and the rack 8a is meshed with the pinion 7a of the pinion shaft 7.

The rack shaft 8 is supported, via a plurality of bearings (not shown), in a rack housing 9 fixed on a vehicle body so that the rack shaft 8 can move in the axial direction X (corresponding to the lateral direction of the vehicle body). Each of the two ends of the rack shaft 8 protrudes outward from a corresponding end portion of the rack housing 9. Each end of the rack shaft 8 is coupled to a corresponding steered wheel 3 via a corresponding tie rod 10 and a corresponding knuckle arm (not shown).

When the steering shaft 5 is rotated in response to an operation of the steering member 2, the rotation of the steering shaft 5 is converted into a linear motion of the rack shaft 8 in the axial direction X by the pinion 7a and the rack 8a. Thus, the steered wheels 3 are steered. The steering system 1 includes the rack guide unit 20. The rack guide unit 20 is arranged on the opposite side of the rack shaft 8 from the pinion 7a. The rack guide unit 20 functions to guide the rack shaft 8 in the axial direction X while urging the rack shaft 8 toward the pinion 7a.

Figure 2:
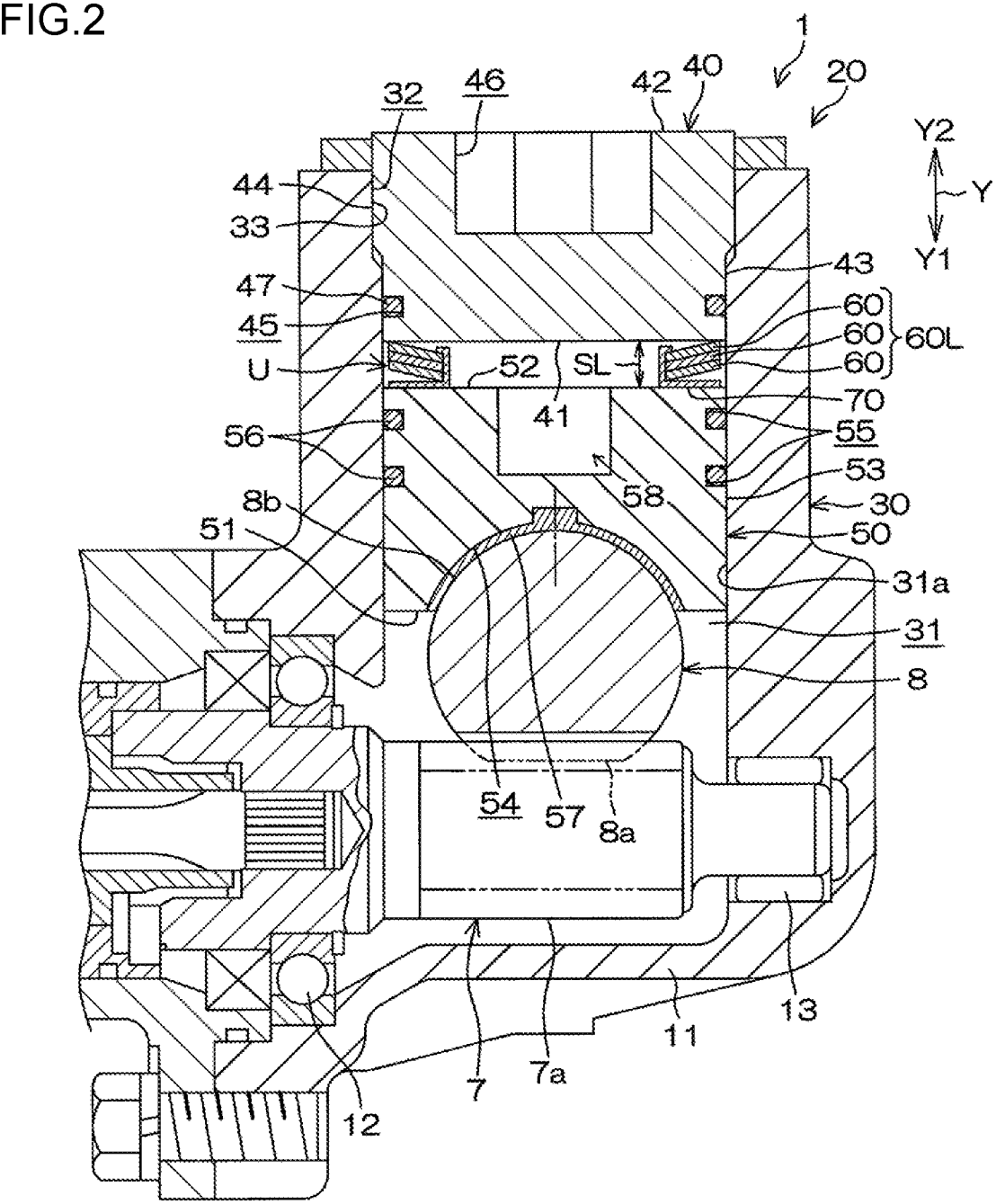
FIG. 2 is a sectional view of an important part of the steering system including the rack guide unit.

FIG. 2 is a sectional view of an important part of the steering system 1. As shown in FIG. 2, the steering system 1 includes a pinion housing 11, a first bearing 12, and a second bearing 13. The pinion housing 11 is provided so as to be integral with the rack housing 9. The first bearing 12 and the second bearing 13 are held by the pinion housing 11, and support the pinion shaft 7 in the pinion housing 11 such that the pinion shaft 7 is rotatable. The first bearing 12 and the second bearing 13 are arranged on both sides of the pinion 7a. The second bearing 13 is arranged on the leading end side of the pinion shaft 7.

The first bearing 12 is, for example, a ball bearing. The second bearing 13 is, for example, a cylindrical roller bearing. The pinion 7a of the pinion shaft 7 and the rack 8a of the rack shaft 8 are meshed with each other in the pinion housing 11. The rack guide unit 20 includes a housing 30, a closure member 40, a rack guide 50, and an urging unit U.

The housing 30 is provided integrated with the pinion housing 11. The housing 30 is arranged on the opposite side of the rack shaft 8 from the pinion 7a. The housing 30 has an accommodation portion 31 that is, for example, a circular hole. The rack shaft 8 passes through the accommodation portion 31. An external opening end 32 is formed on the opposite side of the accommodation portion 31 from the rack shaft 8. The closure member 40 is a plug that is screw-fitted and secured to an inner periphery of the external opening end 32.

The closure member 40 includes a first face 41, a second face 42, and an outer peripheral face 43. The first face 41 faces the rack guide 50. The second face 42 is provided on the opposite side of the closure member 40 from the first face 41. The outer peripheral face 43 of the closure member 40 is provided with an external thread 44 and an outer circumferential groove 45. The outer circumferential groove 45 of the closure member 40 is arranged closer to the rack guide 50 than the external thread 44. An internal thread 33 is formed in a predetermined area from the external opening end 32 of the accommodation portion 31. The external thread 44 of the closure member 40 is screwed into the internal thread 33 to secure the closure member 40 to the housing 30.

The second face 42 of the closure member 40 is provided with a tool engagement hole 46. The tool engagement hole 46 is formed, for example, in a polygonal sectional shape so that the tool engagement hole 46 is engaged with a tool used for screwing the closure member 40 into the housing 30 from the external opening end 32. The outer circumferential groove 45 accommodates a seal member 47. The seal member 47 is an annular elastic member, such as an O-ring. The seal member 47 functions to seal a gap between the outer peripheral face 43 of the closure member 40 and an inner peripheral face 31a of the accommodation portion 31.

The rack guide 50 is accommodated in the accommodation portion 31 so as to be movable in an advancing direction Y1 toward the rack shaft 8 and in a withdrawing direction Y2 toward the closure member 40. Hereinafter, the advancing direction Y1 and the withdrawing direction Y2 are referred to as "advancing/withdrawing direction Y" when collectively called. The rack guide 50 supports a back side 8b of the rack 8a of the rack shaft 8 in a slidable manner. The rack guide 50 includes a first face 51, a second face 52, and an outer peripheral face 53. The first face 51 faces the rack shaft 8. The second face 52 is provided on the opposite side of the rack guide 50 from the first face 51. The outer peripheral face 53 is a cylindrical face. The second face 52 has a recessed portion 58 that is a circular hole formed concentrically with the cylindrical face formed of the outer peripheral face 53.

The first face 51 of the rack guide 50 has a concave face 54 that almost fits to the shape of the back side 8b of the rack shaft 8. A sliding contact plate 57 curved along the concave face 54 is secured to the concave face 54. The sliding contact plate 57 contacts the back side 8b of the rack shaft 8 in a slidable manner. The sliding contact plate 57 is preferably a plate having a low frictional coefficient, and may be a metal plate or a metal plate coated with a fluorine resin.

The outer peripheral face 53 of the rack guide 50 is provided with a plurality of outer circumferential grooves 55 formed therein. Each of the outer circumferential grooves 55 accommodates and holds an annular elastic member 56 such as an O-ring. The outside diameter of the rack guide 50 is slightly smaller than the bore diameter of the accommodation portion 31. The elastic member 56 slides along the inner peripheral face 31a of the accommodation portion 31, and thus the rack guide 50 moves in the accommodation portion 31 in the advancing/withdrawing direction Y with respect to the rack shaft 8. The elastic member 56 functions to restrain the rack guide 50 from tilting in the accommodation portion 31.

The urging unit U is arranged between the first face 41 of the closure member 40 and the second face 52 of the rack guide 50 with a set length of SL. The urging unit U includes a stack 60L of a plurality of coned disc springs 60, and an auxiliary coned disc spring 70 that serves as a holding member. The coned disc springs 60 constituting the stack 60L are arranged in an identical orientation. The coned disc springs 60 constituting the stack 60L are held by the auxiliary coned disc spring 70 that serves as a holding member, and thus are arranged to be aligned with one another.

The stack 60L and the auxiliary coned disc spring 70 are arranged, in series with each other, between the first face 41 of the closure member 40 and the second face 52 of the rack guide 50, and are elastically compressed. In an initial set state, the auxiliary coned disc spring 70 is in a close-contact state, and the stack 60L of the coned disc springs 60 still has a deflection allowance (compression stroke). The stack 60L of the coned disc springs 60 and the auxiliary coned disc spring 70 elastically urge the rack guide 50 toward the rack shaft 8.

Figure 3:
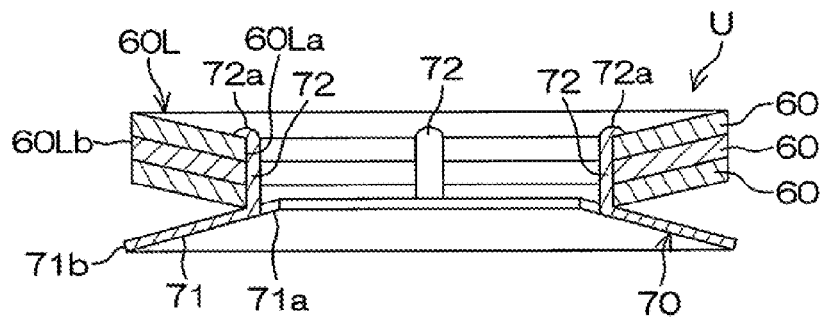
FIG. 3 is a schematic sectional view of an urging unit in a free state.
Figure 4:
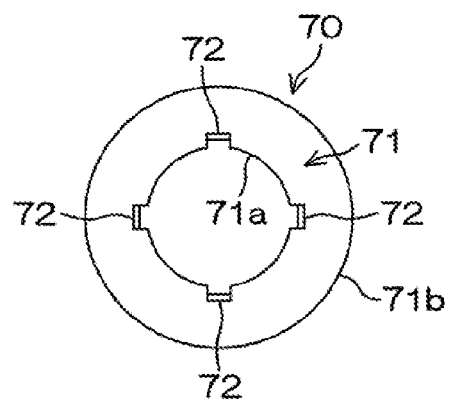
FIG. 4 is a plan view of an auxiliary coned disc spring that serves as a holding member.

FIG. 3 is a schematic sectional view of the urging unit U in a free state. FIG. 4 is a plan view of the auxiliary coned disc spring 70. As shown in FIG. 3, the auxiliary coned disc spring 70 under no-load condition is tilted toward a side opposite a side toward which the stack 60L of the coned disc springs 60 is tilted. As shown in FIGS. 3 and 4, the auxiliary coned disc spring 70 includes an annular auxiliary coned-disc-spring main body 71 and a plurality of holding hooks 72. The auxiliary coned-disc-spring main body 71 includes a radially inner portion 71a and a radially outer portion 71b.

As shown in FIG. 4, the holding hooks 72 are arranged on the radially inner portion 71a of the auxiliary coned-disc-spring main body 71 evenly spaced from one another in a circumferential direction. As shown in FIG. 3, each of the holding hooks 72 extends from the radially inner portion 71a to the stack 60L. The plurality of holding hooks 72 are engaged with a radially inner portion 60La of the stack 60L. Thus, the coned disc springs 60 constituting the stack 60L are aligned with one another. At least two holding hooks 72 may be provided.

Figure 5:
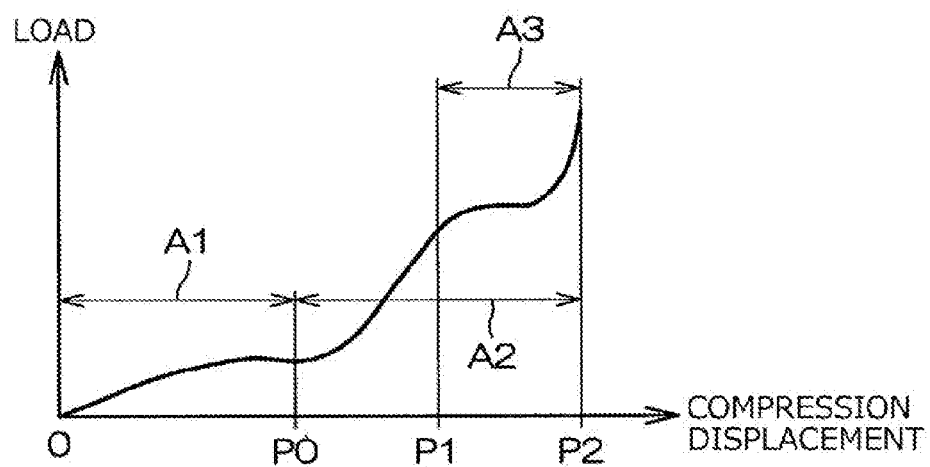
FIG. 5 is a graph showing spring characteristics of the whole urging unit.

A leading end 72a of each of the holding hooks 72 is bent outward (radially outward). The stack 60L is sandwiched between the leading ends 72a of the holding hooks 72 and the radially inner portion 71a of the auxiliary coned-disc-spring main body 71, in a stacking direction. This keeps the coned disc springs 60 constituting the stack 60L from separating from one another in the stacking direction. FIG. 5 is a graph showing spring characteristics of the whole urging unit U (i.e. relationship between compression displacement and load). In FIG. 5, in a first area A1, the auxiliary coned disc spring 70 is subjected to a stroke displacement to exert spring characteristics of the auxiliary coned disc spring 70. The end of the first area A1 in the compression displacement direction corresponds to a close-contact position P0 of the auxiliary coned disc spring 70. In a second area A2, the stack 60L of the coned disc springs 60 is subjected to a stroke displacement in the compression direction to exert spring characteristics of the stack 60L of the coned disc springs 60, with the auxiliary coned disc spring 70 in a close-contact state.

An initial set position P1 of the urging unit U is set to an intermediate position of the displacement range of the second area A2. A stroke range from the initial set position P1 to a close-contact position P2 of the whole urging unit U corresponds to a practical area A3 of the urging unit U. In the present embodiment, the urging unit U including the stack 60L of the serially-arranged coned disc springs 60 and the auxiliary coned disc spring 70 can be installed at a time into the accommodation portion 31 of the housing 30 during assembling, thus improving efficiency of assembly. The auxiliary coned disc spring 70 serves also as a holding member holding the stack 60L of the coned disc springs 60, thus simplifying the structure.

In the initial set state, the auxiliary coned disc spring 70 is in a close-contact state. This produces the below-described advantage. Since long-term use causes abrasion of the sliding part of the rack guide 50 (sliding contact plate 57), which faces the rack shaft 8, the set length SL (see FIG. 2) of the whole urging unit U including the stack 60L of the serially-arranged coned disc springs 60 and the auxiliary coned disc spring 70 may increase.

In such a case, the auxiliary coned disc spring 70 is changed from the close-contact state to a tilt state (in FIG. 5, from the close-contact position P0 to the left side) and is displaced in an extending direction. Thus, the increase of the set length SL of the whole urging unit U can be absorbed, which allows urging force of the urging unit U to be maintained for a long time. Accordingly, even when used in an extremely-rough road area for a long time, the urging unit U can maintain the effect of suppressing abnormal noise.

Figure 6:
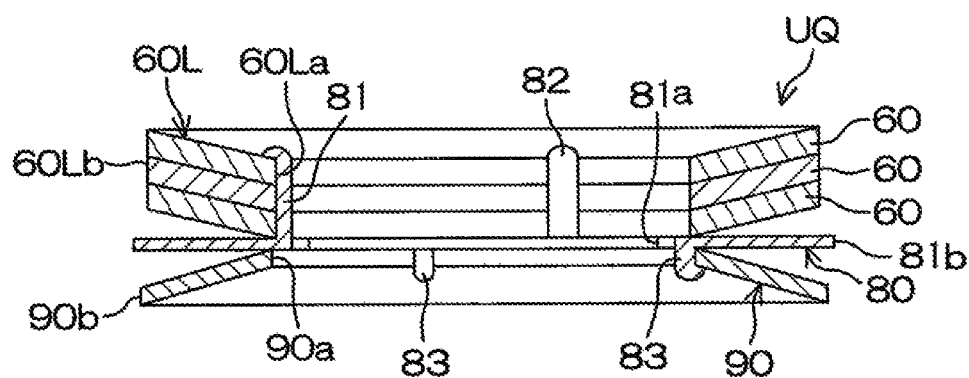
FIG. 6 is a schematic sectional view of an urging unit in a free state according to a second embodiment of the present invention.

To be specific, the auxiliary coned disc spring 70 can be displaced by a distance up to its extension length in the extending direction; the extension length corresponds to the first area A1 shown in FIG. 5 (corresponding to a displacement amount from the close-contact position P0 to zero). The increase of the set length SL of the whole urging unit U can be absorbed within a range of the extension length. In the present embodiment, only the urging member such as the coned disc springs 60 and the auxiliary coned disc spring 70 may be changed in specification from the conventional structure. Since the other components can be standardized, an increase in the number of parts can be suppressed. Furthermore, conventional assembly facilities need not be changed. FIG. 6 is a schematic sectional view of an urging unit UQ in a free state according to a second embodiment of the present invention. Although not shown, a rack guide unit of the second embodiment employs the urging unit UQ of FIG. 6 in place of the urging unit U of the rack guide unit 20 of the first embodiment.

The urging unit UQ of the second embodiment shown in FIG. 6 differs from the urging unit U of the first embodiment shown in FIG. 3, in the following points. That is, the urging unit UQ includes the stack 60L of the coned disc springs 60, a holding member 80, and an auxiliary coned disc spring 90. The auxiliary coned disc spring 90 is arranged in series with the stack 60L. The auxiliary coned disc spring 90 is tilted, in a free state, toward a side opposite a side toward which the stack 60L is tilted. The auxiliary coned disc spring 90 is annular, and includes a radially inner portion 90a and a radially outer portion 90b. The auxiliary coned disc spring 90 is initially set in a close-contact state, when installed in the rack guide unit.

The holding member 80 includes a holding member main body 81, first holding hooks 82, and second holding hooks 83. The holding member main body 81 is an annular plate interposed between the stack 60L and the auxiliary coned disc spring 90. The holding member main body 81 includes a radially inner portion 81a and a radially outer portion 81b. The first holding hooks 82 extend from the radially inner portion 81a of the holding member main body 81 to the stack 60L, and are engaged with the radially inner portion 60La of the stack 60L. Thus, the coned disc springs 60 constituting the stack 60L are aligned with one another.

The second holding hooks 83 extend from the radially inner portion 81a of the holding member main body 81 to the auxiliary coned disc spring 90, and are engaged with a radially inner portion 90a of the auxiliary coned disc spring 90. Thus, the auxiliary coned disc spring 90 is aligned with the coned disc springs 60 constituting the stack 60L. The first holding hooks 82 are arranged on the radially inner portion 81a of the holding member main body 81 evenly spaced from one another in the circumferential direction. The second holding hooks 83 are arranged on the radially inner portion 81a of the holding member main body 81 evenly spaced from one another in the circumferential direction. The first holding hooks 82 and the second holding hooks 83 are arranged with their positions shifted from each other in the circumferential direction of the radially inner portion 81a. At least two first holding hooks 82 and two second holding hooks 83 may be provided.

The coned disc springs 60 constituting the stack 60L and the auxiliary coned disc spring 90 are formed of spring steel. On the other hand, the holding member 80 is formed of, for example, a cold rolled carbon steel sheet, on which working such as press molding is easily performed. In the present embodiment, the urging unit UQ including the stack 60L of the coned disc springs 60 and the auxiliary coned disc spring 90 can be installed at a time into the accommodation portion 31 of the housing 30, thus improving efficiency of assembly. The holding member 80 needs no characteristics of springs as long as it has a holding function. Thus, the holding member 80 can be formed of any material on which working such as press molding of the first holding hooks 82 and the second holding hooks 83 is easily performed.

Figure 7:
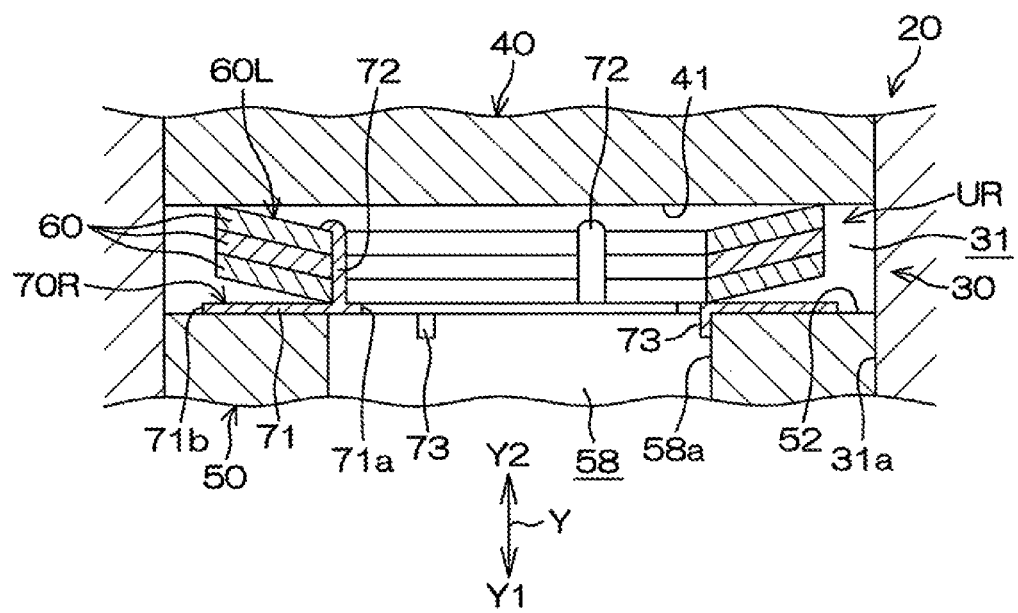
FIG. 7 is a sectional view of an important part of a rack guide unit according to a third embodiment of the present invention.

When long-term use increases the set length SL of the whole urging unit UQ, the auxiliary coned disc spring 90 is changed from the close-contact state to the tilt state, and is displaced toward the extending direction. Thus, the change of the set length SL of the whole urging unit UQ can be absorbed, which allows urging force of the urging unit UQ to be maintained for a long time. Accordingly, even when used in an extremely-rough road area for a long time, the urging unit UQ can maintain the effect of suppressing abnormal noise. FIG. 7 is a sectional view of an important part of a rack guide unit according to a third embodiment of the present invention, which shows structures of the periphery of an urging unit UR. The urging unit UR of the third embodiment shown in FIG. 7 differs from the urging unit U of the first embodiment shown in FIG. 3, in the following points. That is, an auxiliary coned disc spring 70R that serves as a holding member includes aligning projections 73 extending from a radially inner portion 71a of an auxiliary coned-disc-spring main body 71 to the rack guide 50.

The aligning projections 73 are arranged evenly spaced from one another in the circumferential direction of the radially inner portion 71a of the auxiliary coned-disc-spring main body 71. Of the first face 41 of the closure member 40 and the second face 52 of the rack guide 50 facing to each other, the second face 52 is provided with the recessed portion 58 that is a circular hole. The aligning projections 73 are engaged with an inner peripheral face 58a of the recessed portion 58 of the second face 52 of the rack guide 50. Thus, the stack 60L of the coned disc springs 60 is aligned with the rack guide 50.

In the present embodiment, the stack 60L of the coned disc springs 60 can be aligned with the rack guide 50 through the aligning projections 73 of the auxiliary coned disc spring 70R that serves as a holding member. Thus, tilting of the rack guide 50 due to a misalignment of the stack 60L can be suppressed. The present invention is not limited to each embodiment. In the first and the second embodiments, the coned disc springs 60 and the auxiliary coned disc spring 70, 90 may be tilted in opposite directions to the directions shown in the figures. In that case, the holding hooks 72 of the first embodiment and the first holding hooks 82 of the second embodiment may be engaged with a radially outer portion 60Lb of the stack 60L. The holding hooks 83 of the second embodiment may be engaged with a radially outer portion 90b of the auxiliary coned disc spring 90.

In the third embodiment, the aligning projections 73 may be engaged with a recessed portion (not shown) formed in the first face 41 of the closure member 40 so that the stack 60L is aligned with the closure member 40. Alternatively, the aligning projections of the third embodiment may be formed on the holding member 80 of the second embodiment shown in FIG. 6 to be engaged with a recessed portion of either one of the opposite faces of the closure member 40 and the rack guide 50 (the first face 41 and the second face 52).

What is claimed is:

1. A rack guide unit comprising:
   a housing having an accommodation portion through which a rack shaft that is meshed with a pinion shaft passes;
   a closure member secured to an external opening end that is provided on the opposite side of the accommodation portion from the rack shaft;
   a rack guide that is accommodated in the accommodation portion so as to be movable in an advancing/withdrawing direction toward the rack shaft or the closure member, and that supports the rack shaft so that the rack shaft is slidable in an axial direction of the rack shaft; and
   an urging unit that includes a stack of a plurality of coned disc springs urging the rack guide toward the rack shaft and arranged in an identical orientation and a holding member holding the stack, and that is arranged between the closure member and the rack guide, wherein
   the rack guide unit includes an auxiliary coned disc spring that serves as the holding member, the auxiliary coned disc spring arranged in series with the stack and tilted in a free state toward a side opposite a side toward which the stack is tilted, and
   the auxiliary coned disc spring includes an annular auxiliary coned-disc-spring main body, and a plurality of holding hooks extending from a radially inner portion or a radially outer portion of the auxiliary coned-disc-spring main body and engaged with a radially inner portion or a radially outer portion of the stack.

2. A rack guide unit comprising:
   a housing having an accommodation portion through which a rack shaft that is meshed with a pinion shaft passes;
   a closure member secured to an external opening end that is provided on the opposite side of the accommodation portion from the rack shaft;
   a rack guide that is accommodated in the accommodation portion so as to be movable in an advancing/withdrawing direction toward the rack shaft or the closure member, and that supports the rack shaft so that the rack shaft is slidable in an axial direction of the rack shaft; and
   an urging unit that includes a stack of a plurality of coned disc springs urging the rack guide toward the rack shaft and arranged in an identical orientation and a holding member holding the stack, and that is arranged between the closure member and the rack guide, wherein
   the rack guide unit includes an auxiliary coned disc spring that is arranged in series with the stack and tilted in a free state toward a side opposite a side toward which the stack is tilted; and
   the holding member includes a holding member main body interposed between the stack and the auxiliary coned disc spring, a plurality of first holding hooks extending from the holding member main body and engaged with a radially inner portion or a radially outer portion of the stack, and a plurality of second holding hooks extending from the holding member main body and engaged with a radially inner portion or a radially outer portion of the auxiliary coned disc spring.

3. The rack guide unit according to claim 1, wherein the auxiliary coned disc spring is initially set in a close-contact state.

4. The rack guide unit according to claim 1, wherein the holding member includes an aligning projection that is engaged with a recessed portion formed in either one of opposite faces of the rack guide and the closure member so that the stack is aligned with the rack guide or the closure member.

* * * * *